(12) United States Patent
Smoll et al.

(10) Patent No.: US 11,435,530 B2
(45) Date of Patent: Sep. 6, 2022

(54) DYNAMIC CONTACT AND FIBER OPTIC TERMINI CAVITY TO WIRE REMOVABLE SEALS

(71) Applicant: APTIV TECHNOLOGIES LIMITED, St. Michael (BB)

(72) Inventors: Eric James Smoll, Fontana, CA (US); Bao Le, Santa Ana, CA (US); James L. Shuster, New Wilmington, PA (US)

(73) Assignee: APTIV TECHNOLOGIES LIMITED, St. Michael (BB)

( * ) Notice: Subject to any disclaimer, the term of this patent is extended or adjusted under 35 U.S.C. 154(b) by 0 days.

(21) Appl. No.: 17/113,436

(22) Filed: Dec. 7, 2020

(65) Prior Publication Data

US 2022/0179155 A1  Jun. 9, 2022

(51) Int. Cl.
  *G02B 6/38*  (2006.01)
  *H01R 13/52*  (2006.01)

(52) U.S. Cl.
  CPC ......... *G02B 6/3816* (2013.01); *G02B 6/3821* (2013.01); *G02B 6/3869* (2013.01); *G02B 6/3887* (2013.01); *H01R 13/5221* (2013.01); *G02B 6/3849* (2013.01); *G02B 6/3883* (2013.01)

(58) Field of Classification Search
  None
  See application file for complete search history.

(56) References Cited

U.S. PATENT DOCUMENTS

| | | | |
|---|---|---|---|
| 3,792,416 A * | 2/1974 | Moulin | H01R 13/521 439/274 |
| 4,810,832 A * | 3/1989 | Spinner | H01R 13/5205 174/654 |
| 4,959,022 A * | 9/1990 | Neuroth | E21B 17/028 29/857 |
| 5,588,086 A | 12/1996 | Fan | |
| 5,722,842 A | 3/1998 | Cairns | |
| 6,848,834 B1 | 2/2005 | Roehrs et al. | |
| 7,008,270 B1 | 3/2006 | Huh et al. | |
| 8,834,037 B2 | 9/2014 | Wouters | |
| 9,110,266 B2 | 8/2015 | Beamon et al. | |
| 2002/0097964 A1 | 7/2002 | Roehrs et al. | |
| 2020/0338355 A1 * | 10/2020 | Deininger | A61N 1/3754 |

* cited by examiner

*Primary Examiner* — Michael Stahl
(74) *Attorney, Agent, or Firm* — RMCK Law Group, PLC

(57) ABSTRACT

Termini assemblies of electrical cable connector assemblies and methods of formation include a termini housing configured to receive an electrical cable and a dynamic seal assembly disposed in the termini housing and including a first portion having an O-ring seal configuration and configured to seal the termini assembly up to a pressure threshold and a second portion having a cup seal configuration and configured to seal the termini assembly at pressures greater than the pressure threshold. Methods of installing the electrical cable connector assemblies include installing the electrical cable connector assembly in a low or high pressure application, wherein installation in the low pressure application results in at least one of the first and second portions of the dynamic seal assembly sealing the termini assembly, and wherein installation in the high pressure application results in the second portion of the dynamic seal assembly sealing the termini assembly.

20 Claims, 5 Drawing Sheets

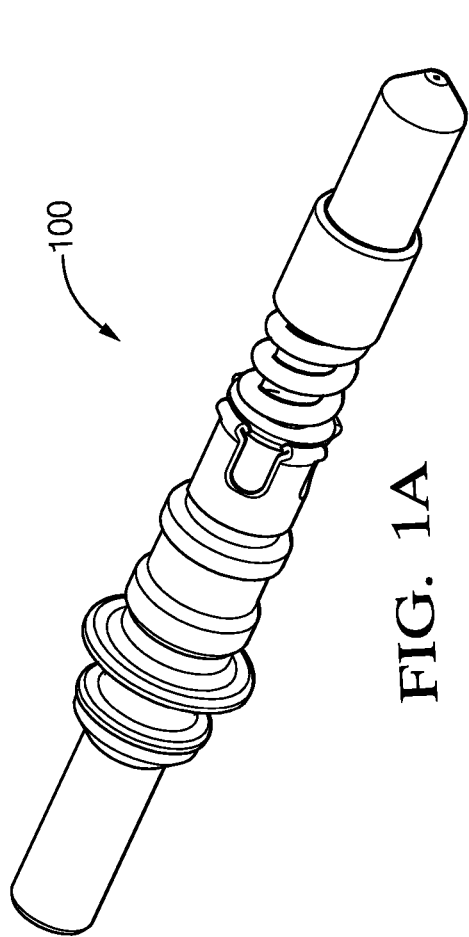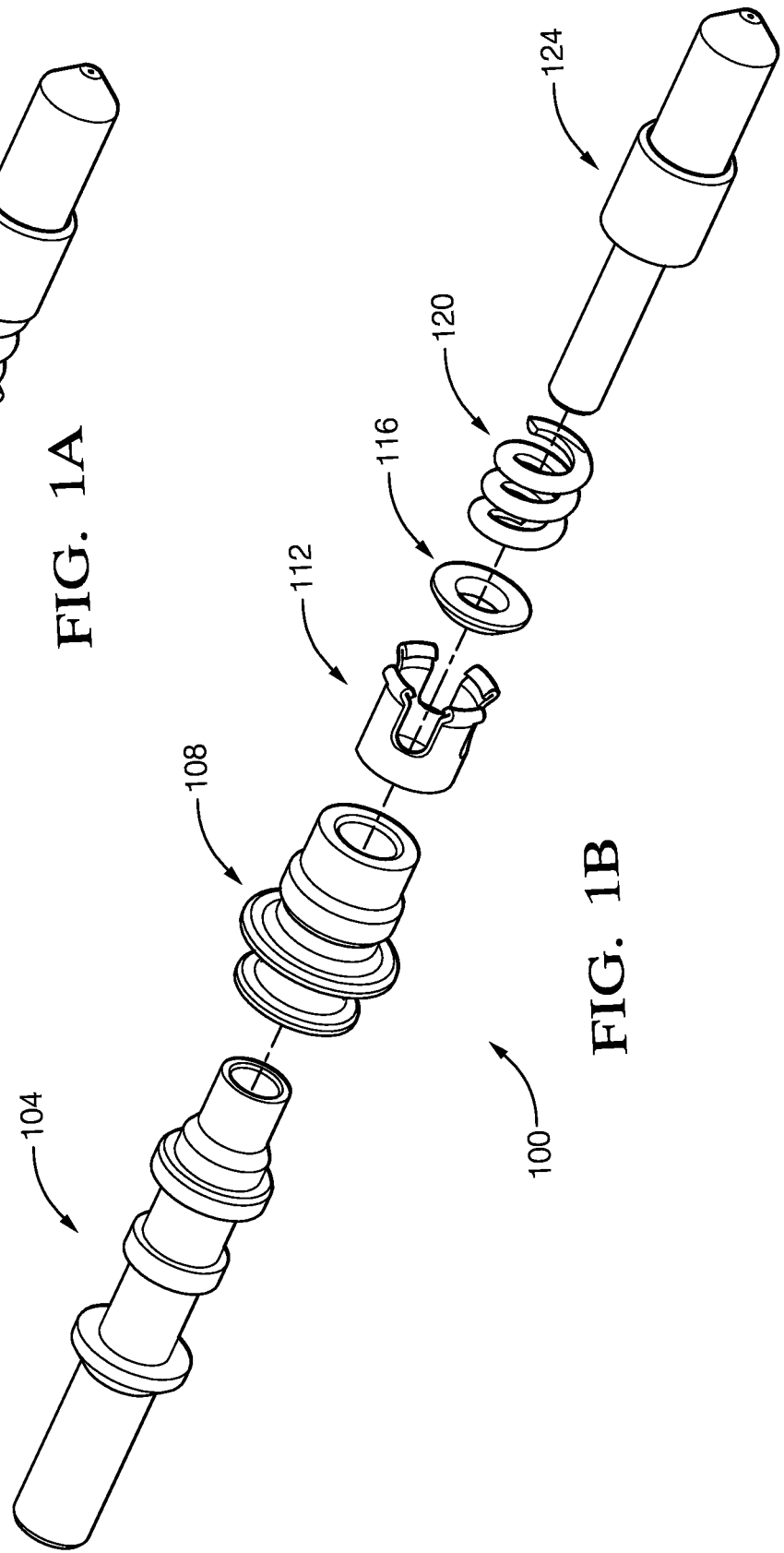

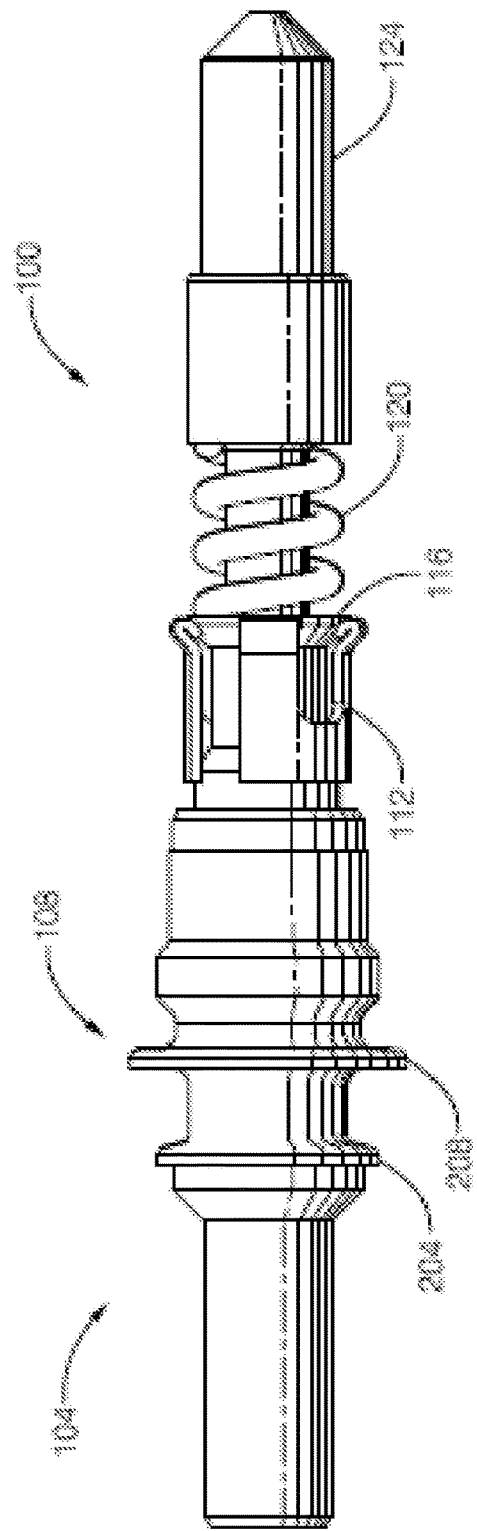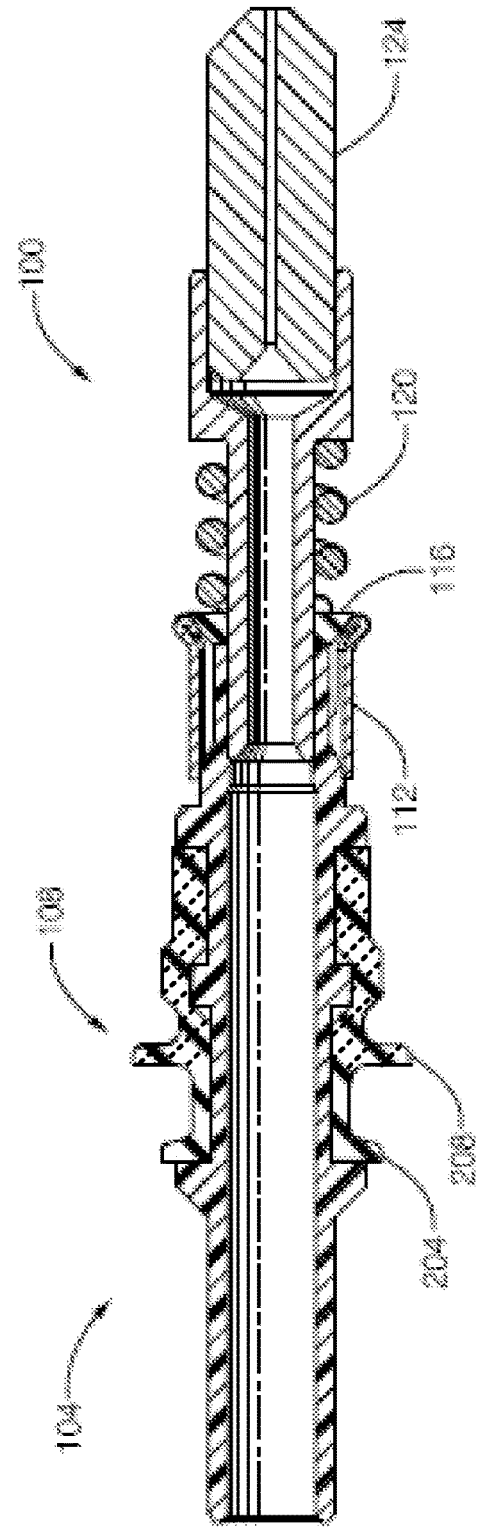

DYNAMIC CONTACT AND FIBER OPTIC TERMINI CAVITY TO WIRE REMOVABLE SEALS

FIELD

The present disclosure generally relates to fiber-optic cables and, more particularly, to dynamic contact and fiber-optic termini cavity to wire removable seals.

BACKGROUND

Fiber-optic cables comprise one or more optical fibers configured to carry light, which makes them ideal for long distance telecommunication and high-speed data applications. Each optical fiber typically comprises core and cladding layers that provide for internal reflection, and each optical fiber is typically then coated with one or more plastic layers. The one or more coated optical fibers are then housed in a protective tube suitable for the environment where the fiber-optic cables are to be employed. In certain environments, the fiber-optic cables must be properly sealed, particularly at the connection ends or termini, in order to prevent water from entering the protective tubes, which could damage the fiber-optic cables. Conventional fiber-optic cable seals include O-ring type seals. These O-ring type seals, however, are only suitable for certain levels of pressure (e.g., <50 pounds per square inch, or psi). For high pressure, deep sea underwater employment of fiber-optic cables, these O-ring type seals may fail. Another conventional solution to this problem is plastic over-molding and potting of the fiber-optic cable termini, but this increases costs and complexity. Thus, while these conventional solutions work for their intended purpose, there exists an opportunity for improvement in the relevant art.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

According to one aspect of the present disclosure, a termini assembly of an electrical cable connector assembly is presented. In one exemplary implementation, the electrical cable connector assembly comprises a termini housing configured to receive an electrical cable and a dynamic seal assembly disposed in the termini housing, the dynamic seal assembly comprising a first portion having an O-ring seal configuration and configured to seal the termini assembly up to a pressure threshold, and a second portion having a cup seal configuration and configured to seal the termini assembly at pressures greater than the pressure threshold.

In some implementations, the dynamic seal assembly is a single piece and the first and second portions are formed of a same material. In some implementations, the material is a polymer. In some implementations, the dynamic seal assembly is removable from the termini housing. In some implementations, a shape of the first portion of the dynamic seal assembly is tunable for a desired differential pressure. In some implementations, the electrical cable connector assembly is a fiber-optic cable connector assembly and the electrical cable is a fiber-optic cable.

According to another aspect of the present disclosure, a method of forming and installing an electrical cable connector assembly is presented. In one exemplary implementation, the method comprises providing the electrical cable connector assembly, including a termini assembly comprising a termini housing configured to receive an electrical cable, providing a dynamic seal assembly within the termini housing, the dynamic seal assembly comprising a first portion having an O-ring seal configuration and configured to seal the termini assembly up to a pressure threshold and a second portion having a cup seal configuration and configured to seal the termini assembly at pressures greater than the pressure threshold, and installing the electrical cable connector assembly in a low-pressure application or a high-pressure application, wherein installation in the low-pressure application results in at least one of the first and second portions of the dynamic seal assembly sealing the termini assembly, and wherein installation in the high-pressure application results in the second portion of the dynamic seal assembly sealing the termini assembly.

In some implementations, providing the dynamic seal assembly comprises providing a single piece with the first and second portions being formed of a same material. In some implementations, the material is a polymer. In some implementations, the dynamic seal assembly is removable from the termini housing. In some implementations, the method further comprises at least temporarily removing the dynamic seal assembly from the termini housing to replace or repair the dynamic seal assembly or to replace or repair another component of the electrical cable connector assembly. In some implementations, the electrical cable connector assembly is a fiber-optic cable connector assembly and the electrical cable is a fiber-optic cable.

According to yet another aspect of the present disclosure, a method of forming and implementing an electrical cable connector assembly is presented. In one exemplary implementation, the method comprises providing a housing, providing an electrical cable at least partially disposed within the housing, providing a termini assembly disposed within the housing and comprising the fiber-optic cable, the termini assembly being configured to seal and protect the electrical cable within the housing, providing a dynamic seal assembly within the termini assembly and the housing, the dynamic seal assembly comprising a first portion having an O-ring seal configuration and configured to seal the termini assembly up to a pressure threshold and a second portion having a cup seal configuration and configured to seal the termini assembly at pressures greater than the pressure threshold, providing a wire assembly distinct from the electrical cable and at least partially disposed within the housing, and providing a spring-loaded connector assembly at least partially disposed within the housing and configured to electrically connect the electrical cable to the wire assembly.

In some implementations, providing the dynamic seal assembly comprises providing a single piece with the first and second portions being formed of a same material. In some implementations, the material is a polymer. In some implementations, the dynamic seal assembly is removable from the termini housing, and the method further comprises at least temporarily removing the dynamic seal assembly from the termini housing to at least one of (i) replace or repair the dynamic seal assembly and (ii) replace or repair another component of the electrical cable connector assembly. In some implementations, the electrical cable connector assembly is a fiber-optic cable connector assembly and the electrical cable is a fiber-optic cable, and wherein the method further comprises installing the fiber-optic cable connector assembly in a high-pressure environment. In some implementations, the high-pressure environment is a high-pressure underwater environment. In some implementations, the dynamic seal assembly prevents water from entering the housing and damaging the fiber-optic cable connector assembly. In some implementations, the method further comprises installing the fiber-optic cable connector assembly proximate to an underwater oil or gas drilling station.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIGS. 1A-1B illustrate exploded and perspective views of an example fiber-optic cable connector assembly comprising a dynamic seal assembly according to some implementations of the present disclosure;

FIGS. 2A-2B illustrate side and cross-sectional views of the example fiber optic cable connector assembly of FIGS. 1A-1B according to some implementations of the present disclosure;

DETAILED DESCRIPTION

Figure 3A:
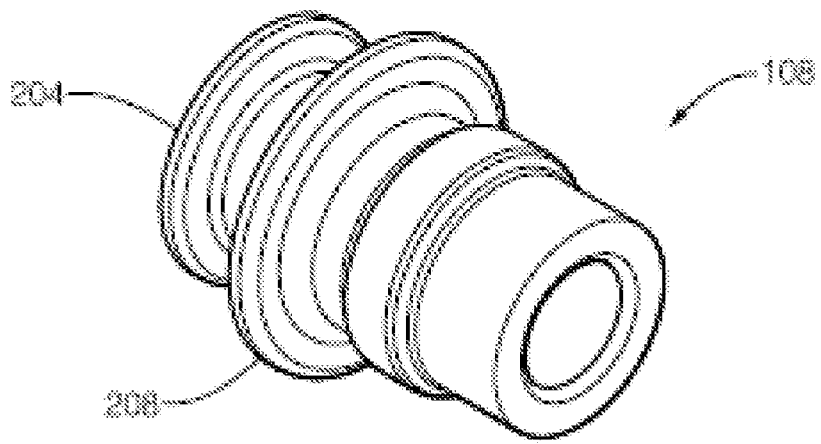
FIGS. 3A-3C illustrate perspective and cross-sectional views of the example dynamic seal assembly according to some implementations of the present disclosure.
Figure 3B:
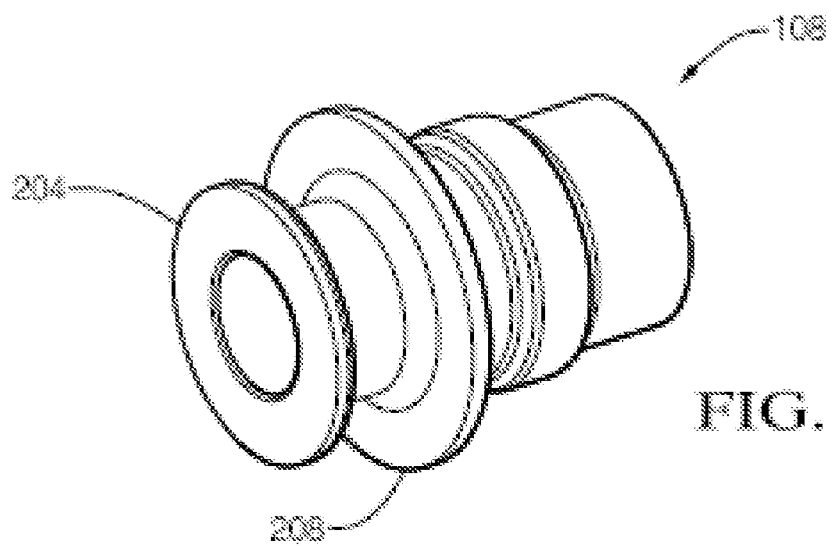
Figure 3C:
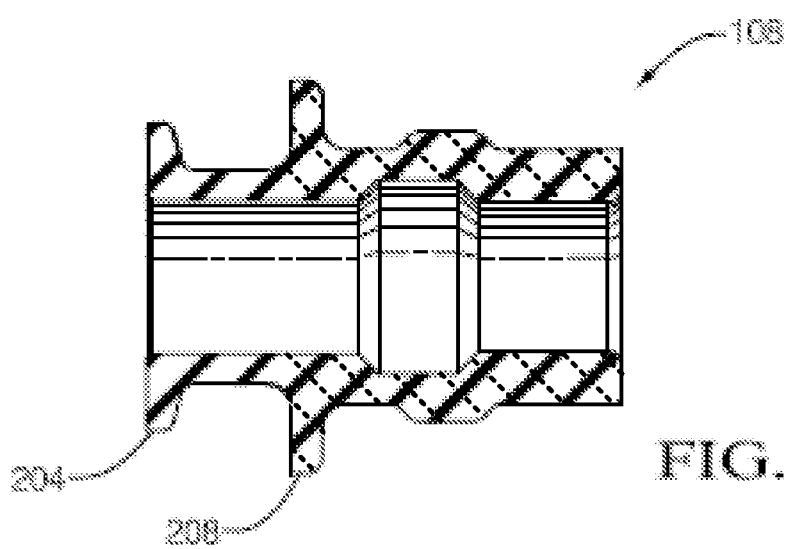

As previously discussed, conventional O-ring type seals for fiber-optic cable connector assemblies can fail, particularly in high pressure, deep sea underwater employment of fiber-optic cables, these O-ring type seals may fail. Another conventional solution to this problem is plastic over-molding and potting of the fiber-optic cable termini. More specifically, the fiber-optic cable termini is overmolded with a plastic material and any remaining space between the fiber-optic cable termini and the overmold is filled with a potting material to further protect and insulate the fiber-optic cable termini. This solution clearly increases costs and size/weight. In addition, this solutions can result in difficulty or the inability for the interior O-ring type seal and/or other components of the fiber-optic cable termini from being accessed for removal/repair. Thus, while these conventional solutions work for their intended purpose, there exists an opportunity for improvement in the relevant art. Accordingly, improved fiber-optic cable termini, connector assemblies, and their methods of formation/manufacture and installation/repair are presented herein. While fiber-optic cable termini are specifically described herein, it will be appreciated that the dynamic seal assemblies of the present disclosure can be applicable to other types of electrical connectors and their assemblies, including, but not limited to, coaxial, pin, and socket type electrical connectors/assemblies. The terms "electrical cable," "electrical connector," and "electrical cable connector assembly" as used herein can encompass all of these various types of electrical cables/connectors/assemblies including fiber-optic cables and termini.

Referring now to FIGS. 1A-1B, 2A-2B, 3A-3C, and 4, various views of an example fiber-optic cable connector assembly 100 are illustrated. The fiber-optic cable connector assembly comprises a termini assembly 104 for connecting a fiber-optic cable to another electrical system, which could be another fiber-optic cable or another wire assembly. The termini assembly 104 is configured to seal and protect the fiber-optic cable within a housing 102. The termini assembly 104 comprises a dynamic seal assembly 108 that is capable of providing sealing in both low pressure and high-pressure environments. As previously mentioned, conventional O-ring type seals alone can fail in high-pressure environments (e.g., pressures greater than ~50 pounds per square inch, or psi).

In one exemplary implementation of the present disclosure, the fiber-optic cable connector assembly 100 is installed in a high-pressure environment such as a high-pressure underwater environment, where the pressure could be in the thousands of psi. In such an application, the dynamic seal assembly 108 could also prevent water from entering the housing 102 and damaging the fiber-optic cable connector assembly 100. One non-limiting installation example of the fiber-optic cable connector assembly 100 in a high-pressure underwater environment is proximate to an underwater oil or gas drilling station. While these specific high-pressure and underwater applications are specifically mentioned herein, it will be appreciated that the fiber-optic cable connector assembly 100 with its dynamic seal assembly 108 could be installed/implemented in any suitable low-pressure or high-pressure environment. By being able to be used for both low-pressure and high-pressure applications, the same fiber-optic cable connector assembly 100 could be more easily and mass manufactured, which could decrease costs.

The dynamic seal assembly 108 comprises a first portion 204 having an O-ring seal configuration and configured to seal the termini assembly 104 up to a pressure threshold. For example only, this pressure threshold could be ~50 psi, but it will be appreciated that the dynamic seal assembly 108 could be designed to have a different pressure threshold, such as depending on the desired application. In some implementations, a shape and/or size of the first portion 204 is tunable for a desired application (e.g., a desired differential pressure threshold). The dynamic seal assembly 108 further comprises a second portion 208 having a cup seal configuration and configured to seal the termini assembly 104 at pressures greater than the pressure threshold. In the exemplary implementation shown, the dynamic seal assembly is also a single piece and the first and second portions 204, 208 are formed of the same material, such as a polymer. Using the same material and manufacturing as a single piece can further reduce costs and also decreases the number of potential failure points. The first and second portions 204, 208 also are both capable of functioning without negatively affecting or impacting the functionality of the other.

Figure 4:
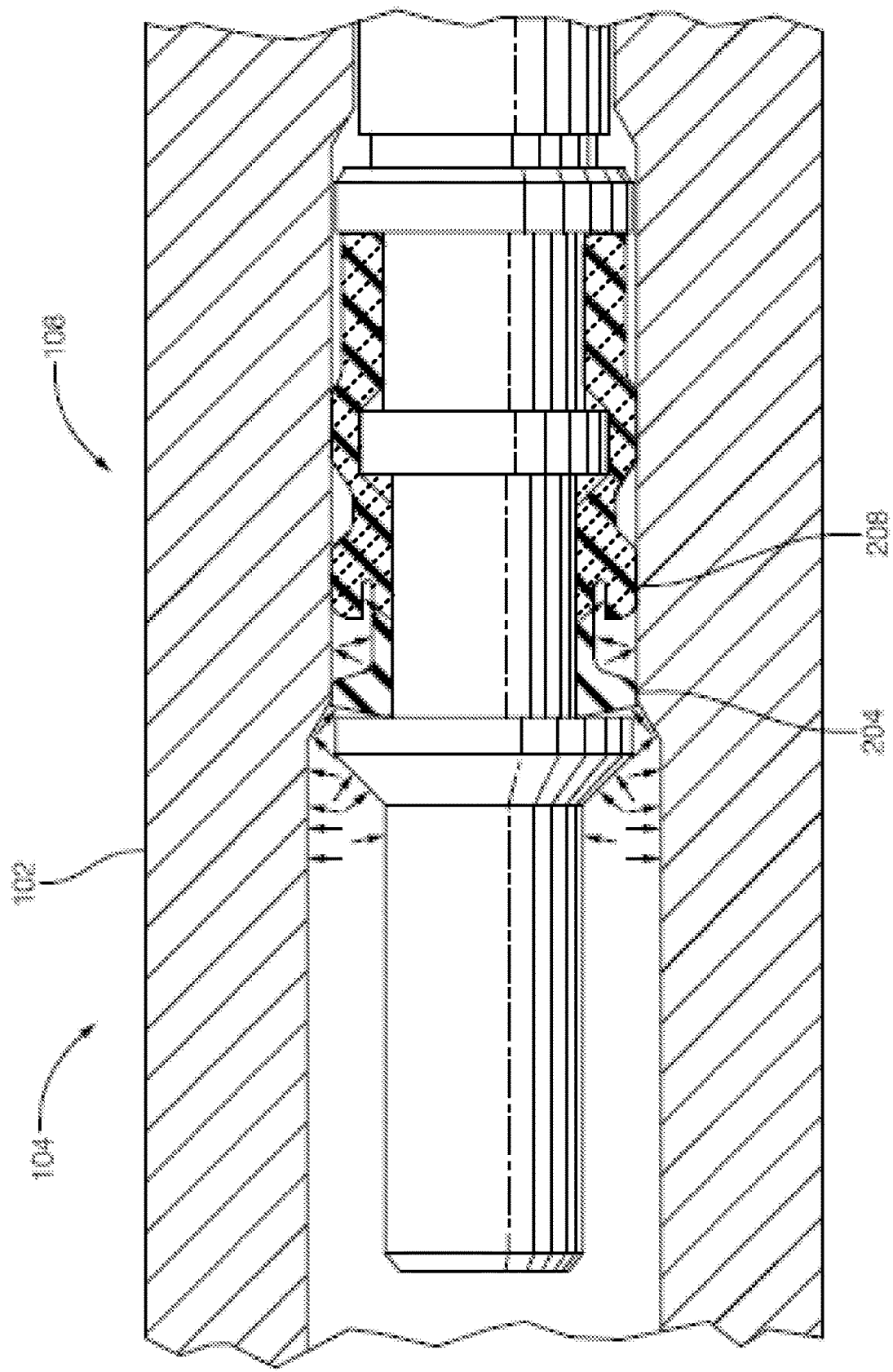
FIG. 4 illustrates a side view of the example fiber-optic cable connector assembly and the example dynamic seal assembly under a high-pressure application according to some implementations of the present disclosure.

The remaining components of the fiber-optic cable connector assembly 100 include a spring-loaded connector assembly comprising a base member 112, a seal 116, a spring 120, and a connector member 124 configured to be inserted into another electrical connector or to electrically connect to another electrical system (e.g., another wire assembly) in some suitable manner. In some implementations, the dynamic seal assembly 108 is removable from the termini housing 104. The ability to at least temporarily remove the dynamic seal assembly 108 from the termini assembly 104 provides for the opportunity or ability to replace or repair the dynamic seal assembly 108 and/or other component(s) of the fiber-optic cable connector assembly 100. FIG. 4 further illustrates the termini assembly 104 disposed within the housing 102 of the fiber-optic cable connector assembly 100. As shown, the second portion 208 of the dynamic seal assembly 108 folds over within the housing 102 to create the U-type or cup seal sealing configuration. Pressure arrows are illustrated in FIG. 4 to show how increasing pressure affects the dynamic seal assembly 108, with the second portion 208 providing sealing in the event that the first portion 204 fails.

Figure 5:
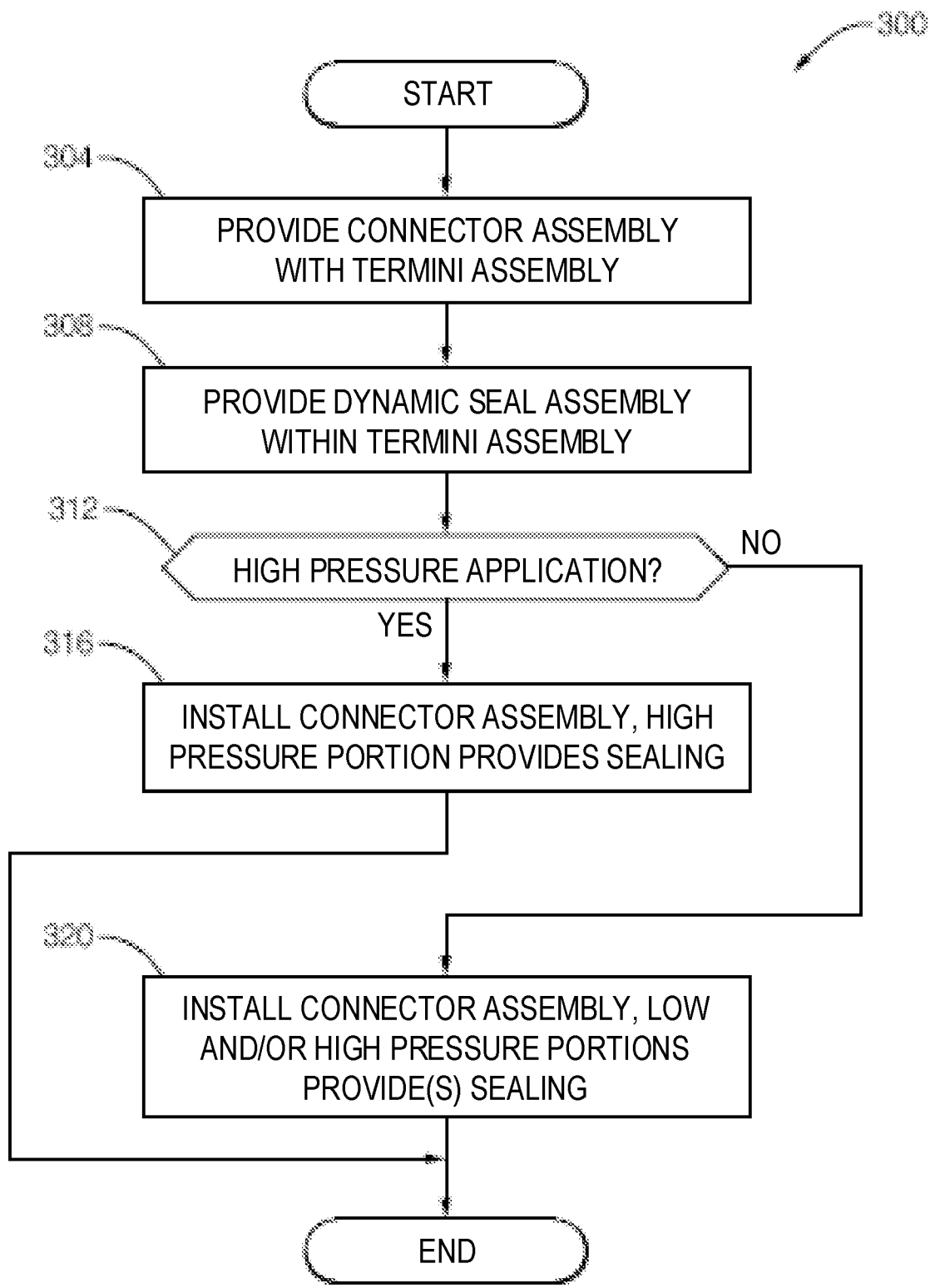
FIG. 5 illustrates a flow diagram of a method of forming and installing a fiber-optic cable connector in either low or high-pressure applications according to some implementations of the present disclosure.

Referring now to FIG. 5, a flow diagram of an example method 300 of forming and installing a fiber-optic cable connector in either low or high-pressure applications according to some implementations of the present disclosure is illustrated. For purposes of this disclosure, the components of the fiber-optic cable connector assembly 100 are references, but it will be appreciated that another assembly having the dynamic seal assembly 108 could be applicable. At 304, the fiber-optic cable connector assembly 100 with the termini assembly 104 is provided. At 308, the dynamic seal assembly 108 is provided within the termini assembly 104. At 312, it is determined whether the fiber-optic cable connector assembly 100 is being installed in a low-pressure or a high-pressure environment. As previously discussed, the same fiber-optic cable connector assembly 100 can be utilized for both applications, but the dynamic seal assembly 108 may function differently in these different applications. More specifically, in the high-pressure environment, it is likely that the first portion 204 could fail and thus the second portion 208 would provide the sealing functionality (see 316), whereas in the low-pressure environment, the first and/or second portions 204, 208 may provide sealing (see 320).

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A termini assembly of an electrical cable connector assembly, the termini assembly comprising:
   a termini housing configured to receive an electrical cable;
   a dynamic seal assembly disposed in the termini housing, the dynamic seal assembly comprising:
      a first portion having an O-ring seal configuration and configured to seal the termini assembly up to a pressure threshold, and
      a second portion having a cup seal configuration and configured to seal the termini assembly at pressures greater than the pressure threshold; and
   a spring-loaded connector assembly at least partially disposed within the termini housing and configured to electrically connect the electrical cable to a wire assembly distinct from the electrical cable.

2. The termini assembly of claim 1, wherein the dynamic seal assembly is a single piece and the first and second portions are formed of a same material.

3. The termini assembly of claim 2, wherein the material is a polymer.

4. The termini assembly of claim 1, wherein the dynamic seal assembly is removable from the termini housing.

5. The termini assembly of claim 1, wherein a shape of the first portion of the dynamic seal assembly is tunable for a desired differential pressure.

6. The electrical cable connector assembly of claim 1, wherein the electrical cable connector assembly is a fiber-optic cable connector assembly and the electrical cable is a fiber-optic cable.

7. A method of forming and installing an electrical cable connector assembly, the method comprising:
   providing the electrical cable connector assembly, including a termini assembly comprising a termini housing configured to receive an electrical cable;
   providing a dynamic seal assembly within the termini housing, the dynamic seal assembly comprising:
      a first portion having an O-ring seal configuration and configured to seal the termini assembly up to a pressure threshold, and a second portion having a cup seal configuration and configured to seal the termini assembly at pressures greater than the pressure threshold;

providing a wire assembly distinct from the electrical cable and at least partially disposed within the termini housing; and providing a spring-loaded connector assembly at least partially disposed within the termini housing and configured to electrically connect the electrical cable to the wire assembly; and installing the electrical cable connector assembly in a low-pressure application or a high-pressure application, wherein installation in the low-pressure application results in at least one of the first and second portions of the dynamic seal assembly sealing the termini assembly, and wherein installation in the high-pressure application results in the second portion of the dynamic seal assembly sealing the termini assembly.

8. The method of claim 7, wherein providing the dynamic seal assembly comprises providing a single piece with the first and second portions being formed of a same material.

9. The method of claim 8, wherein the material is a polymer.

10. The method of claim 7, wherein the dynamic seal assembly is removable from the termini housing.

11. The method of claim 9, further comprising at least temporarily removing the dynamic seal assembly from the termini housing to replace or repair the dynamic seal assembly or to replace or repair another component of the electrical cable connector assembly.

12. The method of claim 7, wherein the electrical cable connector assembly is a fiber-optic cable connector assembly and the electrical cable is a fiber-optic cable.

13. A method of forming and implementing an electrical cable connector assembly, the method comprising:

providing a housing;

providing an electrical cable at least partially disposed within the housing;

providing a termini assembly disposed within the housing and comprising the electrical cable, the termini assembly being configured to seal and protect the electrical cable within the housing;

providing a dynamic seal assembly within the termini assembly and the housing, the dynamic seal assembly comprising:

a first portion having an O-ring seal configuration and configured to seal the termini assembly up to a pressure threshold, and a second portion having a cup seal configuration and configured to seal the termini assembly at pressures greater than the pressure threshold;

providing a wire assembly distinct from the electrical cable and at least partially disposed within the housing; and providing a spring-loaded connector assembly at least partially disposed within the housing and configured to electrically connect the electrical cable to the wire assembly.

14. The method of claim 13, wherein providing the dynamic seal assembly comprises providing a single piece with the first and second portions being formed of a same material.

15. The method of claim 14, wherein the material is a polymer.

16. The method of claim 13, wherein the dynamic seal assembly is removable from the termini housing, and wherein the method further comprises at least temporarily removing the dynamic seal assembly from the termini housing to at least one of (i) replace or repair the dynamic seal assembly and (ii) replace or repair another component of the electrical cable connector assembly.

17. The method of claim 13, wherein the electrical cable connector assembly is a fiber-optic cable connector assembly and the electrical cable is a fiber-optic cable, and wherein the method further comprises installing the fiber-optic cable connector assembly in a high-pressure environment.

18. The method of claim 17, wherein the high-pressure environment is a high-pressure underwater environment.

19. The method of claim 18, wherein the dynamic seal assembly prevents water from entering the housing and damaging the fiber-optic cable connector assembly.

20. The method of claim 18, further comprising installing the fiber-optic cable connector assembly proximate to an underwater oil or gas drilling station.

\* \* \* \* \*